United States Patent
Chen et al.

(10) Patent No.: US 11,311,939 B2
(45) Date of Patent: Apr. 26, 2022

(54) METHOD FOR FABRICATION OF COPPER-SILVER AND COPPER-GOLD POROUS MICROSHEETS

(71) Applicant: HONDA MOTOR CO., LTD., Tokyo (JP)

(72) Inventors: Gugang Chen, Palo Alto, CA (US); Shutang Chen, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 16/537,298

(22) Filed: Aug. 9, 2019

(65) Prior Publication Data

US 2021/0039171 A1 Feb. 11, 2021

(51) Int. Cl.
| | | |
|---|---|---|
| B22F 9/16 | (2006.01) | |
| B01J 23/89 | (2006.01) | |
| B01J 35/02 | (2006.01) | |
| B01J 35/10 | (2006.01) | |
| B01J 37/04 | (2006.01) | |
| B01J 37/03 | (2006.01) | |

(Continued)

(52) U.S. Cl.
CPC ............ *B22F 9/16* (2013.01); *B01J 23/8926* (2013.01); *B01J 35/02* (2013.01); *B01J 35/1061* (2013.01); *B01J 35/1066* (2013.01); *B01J 35/1071* (2013.01); *B01J 35/1085* (2013.01); *B01J 37/031* (2013.01); *B01J 37/04* (2013.01); *B01J 37/06* (2013.01); *B22F 1/0044* (2013.01); *B22F 2301/10* (2013.01); *B22F 2301/255* (2013.01); *B22F 2304/10* (2013.01)

(58) Field of Classification Search
CPC ...... B22F 9/16; B22F 1/0044; B22F 2301/10; B22F 2301/255; B22F 2304/10; B01J 23/8926; B01J 35/02; B01J 35/1061; B01J 35/1066; B01J 35/1071; B01J 35/1085; B01J 37/031; B01J 37/04; B01J 37/06
USPC .......................... 148/243; 977/755, 810, 890
See application file for complete search history.

(56) References Cited

U.S. PATENT DOCUMENTS

| | | | | |
|---|---|---|---|---|
| 10,577,678 B2 | * | 3/2020 | Yin | .................. B22F 1/025 |
| 2011/0124500 A1 | * | 5/2011 | Fang | ..................... B82Y 30/00 |
| | | | | 502/331 |

(Continued)

FOREIGN PATENT DOCUMENTS

| | | | | | |
|---|---|---|---|---|---|
| CN | 10 5414558 | * | 3/2016 | ............... | B22F 9/24 |
| CN | 106807378 A | | 6/2017 | | |
| WO | WO 2021/030022 | * | 2/2021 | ............ | B01J 23/755 |

OTHER PUBLICATIONS

Hui Zhang et al., "Synthesis of Pd—Pt Bimetallic Nanocrystals with a Concave Structure through a Bromide-Induced Galvanic Replacement Reaction." Journal of the American Chemical Society, 133, pp. 6078-6089. (Year: 2011).*

(Continued)

*Primary Examiner* — Patricia L. Hailey
(74) *Attorney, Agent, or Firm* — ArentFox Schiff LLP; Mark Duell

(57) ABSTRACT

A method for preparing copper-solver and copper-gold porous microsheets with specific pore sizes, the method including the steps of providing a solution of copper microsheets and adding a silver or gold solution under controlled temperature, the reaction conditions can be changed to determine pore sizes.

14 Claims, 12 Drawing Sheets
(3 of 12 Drawing Sheet(s) Filed in Color)

(51) Int. Cl.
    B01J 37/06    (2006.01)
    B22F 1/00    (2006.01)

(56) References Cited

U.S. PATENT DOCUMENTS

| | | | | |
|---|---|---|---|---|
| 2012/0208696 | A1* | 8/2012 | Stamenkovic | H01M 4/921 |
| | | | | 502/326 |
| 2017/0259610 | A1* | 9/2017 | Cheng | C09D 11/03 |
| 2017/0296997 | A1* | 10/2017 | Mukherjee | H01M 4/921 |
| 2018/0316023 | A1* | 11/2018 | Fang | H01M 4/921 |
| 2018/0339345 | A1* | 11/2018 | Chopra | B22F 1/0018 |
| 2019/0376194 | A1* | 12/2019 | Chen | B01J 23/72 |
| 2020/0156157 | A1* | 5/2020 | Chen | B22F 1/0018 |

OTHER PUBLICATIONS

Hu-Ming Ren et al., "One-Step Preparation of Silver Hexagonal Microsheets as Electrically Conductive Adhesive Fillers for Printed Electronics", ACS Applied Materials Interfaces, (2015), pp. 13685-13692.

International Search Report and Written Opinion, issued by International Searching Authority in corresponding International Application No. PCT/US2020/043182, dated Nov. 19, 2020.

Melinda Mohl et al., "Formation of CuPd and CuPt Bimetallic Nanotubes by Galvanic Replacement Reaction", The Journal of Physical Chemistry C 115 (2011), pp. 9403-9409.

P. Pienpinijtham et al., "Gold microsheets having nano/microporous structures fabricated by ultrasonic-assisted cyclic galvanic replacement", RSC Advances 5 (2015),The Royal Society of Chemistry (9 Pages Total).

Guangfang Grace Li et al., "Galvanic Replacement-Driven Transformations of Atomically Intermixed Bimetallic Colloidal Nanocrystals: Effects of Compositional Stoichiometry and Structural Ordering", 2018 American Chemical Society, Langmuir, 34, pp. 4340-4350, (2018).

Jianfeng Huang et al., "Structural Sensitivities in Bimetallic Catalysts for Electrochemical CO2 Reduction Revealed by Ag—Cu Nanodimers", 2019 American Chemical Society, Journal of the American Chemical Society, 141, pp. 2490-2499, (2019).

Jingjie Ge et al., "Ultrathin Palladium Nanomesh for Electrocatalysis", Angewandte Chemie International Edition, 57, Wiley Online Library, pp. 3435-3438, (2018).

Lei Zhang et al., Nanocatalysts: Platinum-based nanocages with subnanometer-thick walls and well-defined, controllable facets, Research, Reports, sciencemag.org, Science, vol. 349, Issue 6246, (pp. 412-416, 6 pages total), Jul. 24, 2015.

Sunghoon Lee et al., "Ultrasoft electronics to monitor dynamically pulsing cardiomyocytes", Nature Nanotechnology, vol. 14, pp. 156-160, (Feb. 2019).

Xiaoying Lin et al., "Synthesis of circular and triangular gold nanorings with tunable optical properties", The Royal Society of Chemistry 2017, Chem. Commun., 53, pp. 10765-10767, (2017).

* cited by examiner

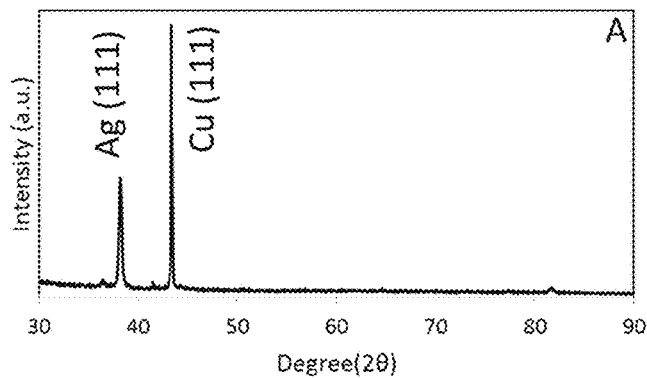 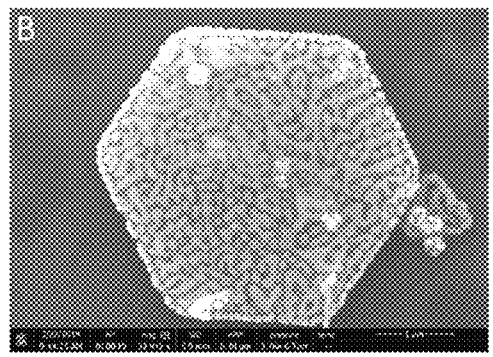
FIG. 5A  FIG. 5B
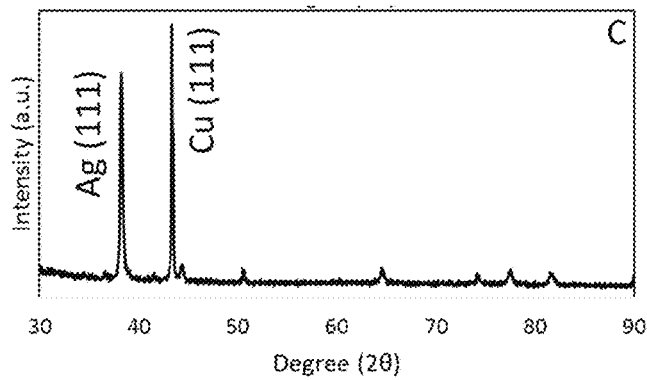 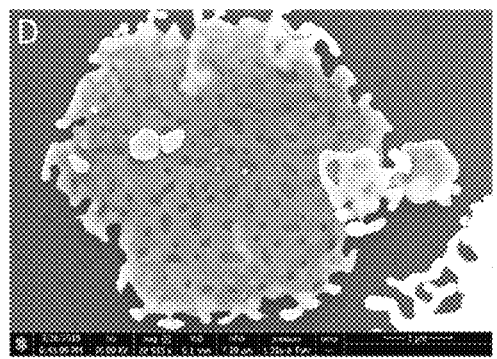
FIG. 6A  FIG. 6B
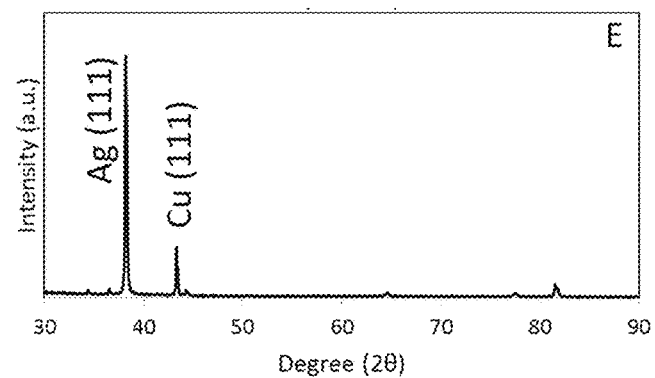 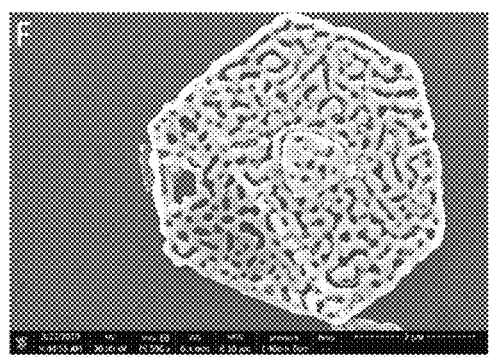
FIG. 7A  FIG. 7B

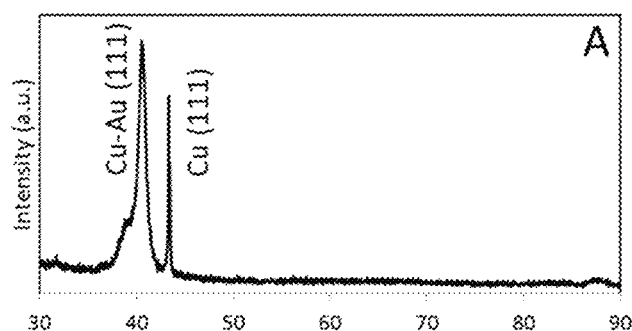
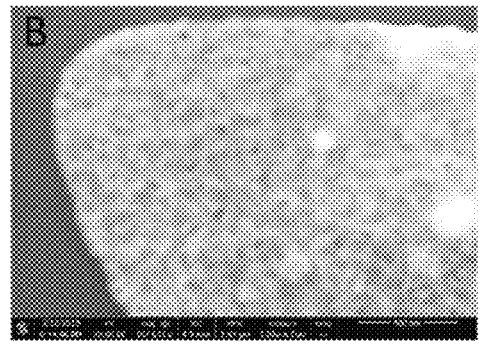
FIG. 9A                FIG. 9B
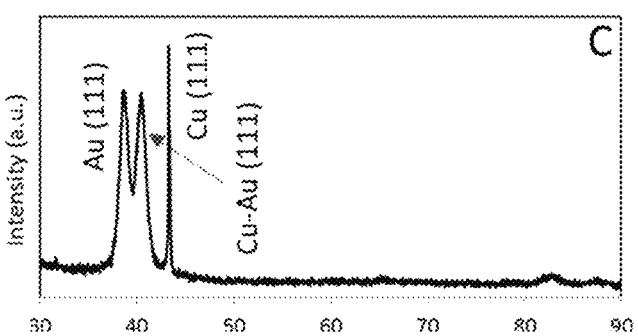
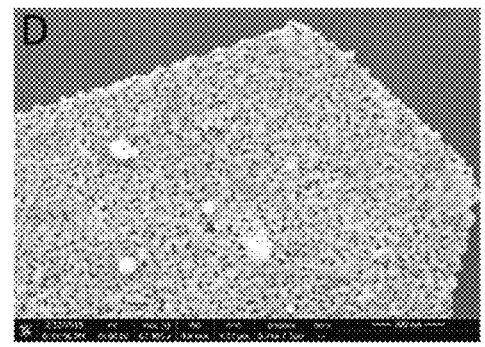
FIG. 10A               FIG. 10B
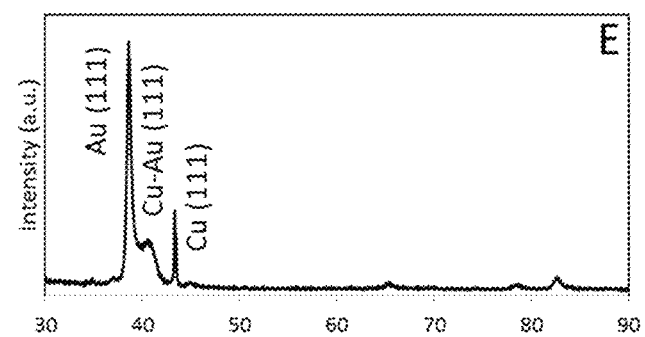
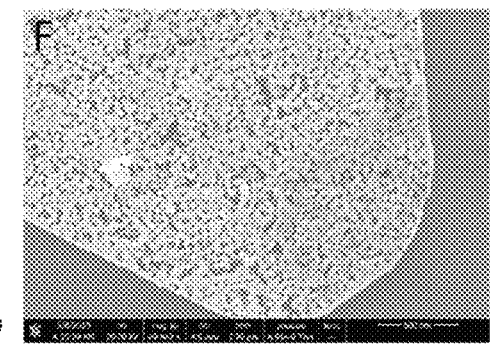
FIG. 11A               FIG. 11B

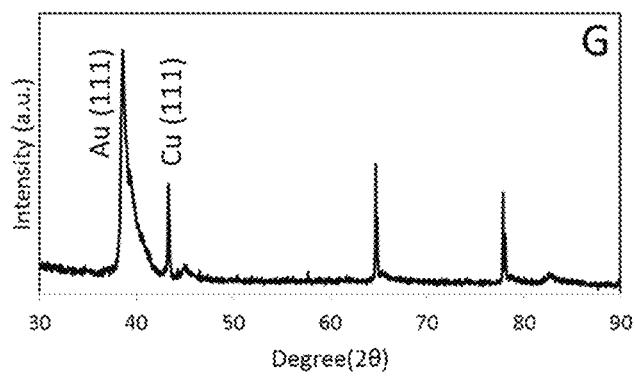
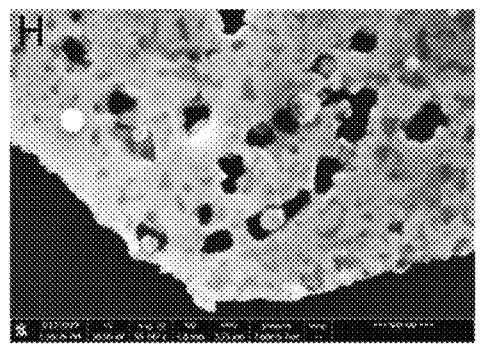
FIG. 12A                FIG. 12B
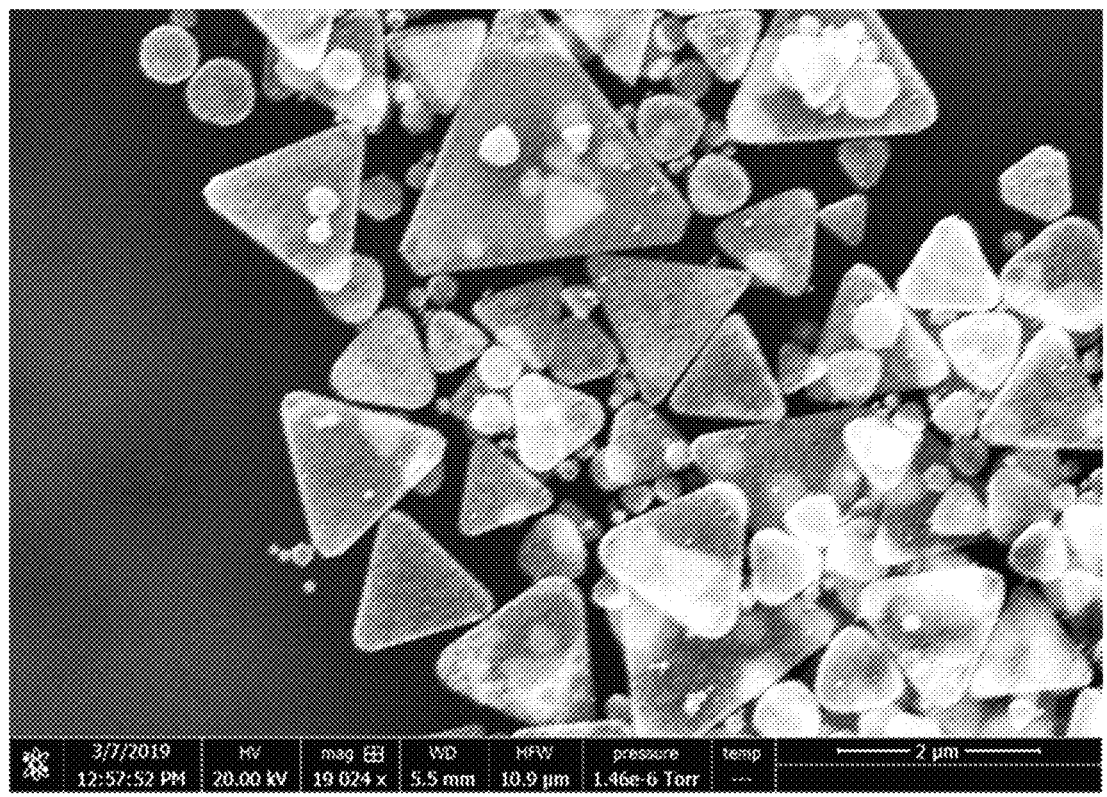
FIG. 13

METHOD FOR FABRICATION OF COPPER-SILVER AND COPPER-GOLD POROUS MICROSHEETS

TECHNICAL FIELD

The present disclosure is directed to a method for fabrication of copper-silver and copper-gold porous microsheets.

BACKGROUND

Monometal porous nanostructures have drawn extensive attention due to their abundant active sites and high specific surface area. Constructing pores or holes in the metal sheets can further promote their different exposed crystal faces, increasing specific surface area and atomic utilization efficiency. Many bimetallic nanostructures have been successfully synthesized through a galvanic replacement method or Kinkendall effect strategy, however, it is large challenge to use a precision method to fabricate bimetallic porous microsheets with size-controlled pores. As such, there is a need in the art for an effective and efficient method for fabrication of copper-silver and copper-gold porous microsheets with predictable features.

SUMMARY

The present disclosure is directed to a method for fabricating copper-silver (Cu—Ag) and copper-gold (Cu—Au) porous microsheets. According to some aspects, the surface pores and their size can be controlled by adjusting the reaction temperature and the injecting amounts of a second metal. Moreover, a possible pore formation mechanism is proposed herein. Compared to the traditional galvanic replacement method for the fabrication of bimetallic nanostructures, the disclosed method not only simplifies the synthetic process, but also opens a new door to synthesize two-dimensional porous structures. These Cu—Ag and Cu—Au porous microsheets with large surface area will have potential applications such as catalysts for developing new energies and as conductive films for the fabrication of gas sensors. This disclosure is also directed to porous microsheets provided by the method described herein and devices comprising the porous microsheets provided by the method described herein, as well as methods of using the same.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A and 5B show an XRD pattern (5A) and an SEM image (5B) of a Cu-rich Cu—Ag porous sheet prepared at 100° C. through injecting 17 mg of Ag-OLA precursor.

FIGS. 6A and 6B show an XRD pattern (6A) and an SEM image (6B) of a Cu—Ag porous sheet prepared at 120° C. through injecting 8 mg of Ag-OLA precursor.

FIGS. 7A and 7B show an XRD pattern (7A) and an SEM image (7B) of an Ag-rich Cu—Ag porous sheet prepared at 120° C. through injecting 17 mg of Ag-OLA precursor.

FIGS. 9A-9B show XRD patterns (9A) and an SEM image (9B) of Cu—Au porous sheets prepared at injection temperature 120° C. through injecting 50 mg of Au-OLA precursor solution.

FIGS. 10A-10B show XRD patterns (10A) and an SEM image (10B) of Cu—Au porous sheets prepared at injection temperature 140° C. through injecting 50 mg of Au—OLA precursor solution.

FIGS. 11A-11B show XRD patterns (11A) and an SEM image (11B) of Cu—Au porous sheets prepared at injection temperature 160° C. through injecting 50 mg of Au—OLA precursor solution.

FIGS. 12A-12B show XRD patterns (12A) and an SEM image (12B) of Cu—Au porous sheets prepared at injection temperature 180° C. through injecting 50 mg of Au—OLA precursor solution.

FIG. 13 shows an SEM image of large area Cu—Au porous microsheets with small pore sizes.

DETAILED DESCRIPTION

Figure 1:
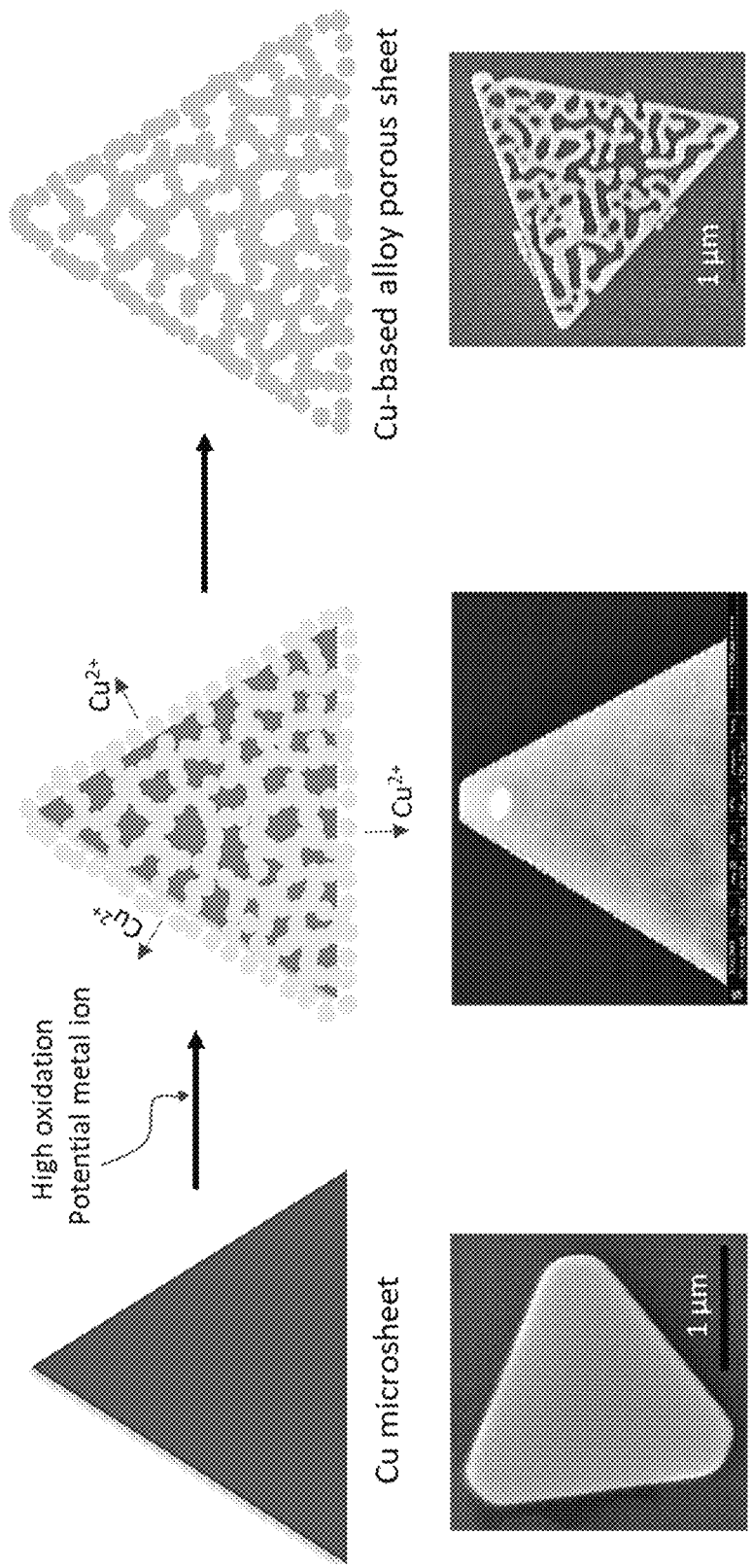
FIG. 1 shows a formation scheme of porous sheets and their corresponding scanning electron microscope (SEM) images at different reaction stages.

The present disclosure is directed to a method for fabrication of copper-silver and copper-gold porous microsheets. In some embodiments, the method can comprise preparation of a copper complex solution, which is combined with a hot reaction mixture under an inert atmosphere and kept hot for a period of time. After some cooling of the hot reaction mixture, a silver or gold precursor solution is slowly combined, for example by injection, with the reaction mixture. The copper-silver or copper-gold porous microsheets will then form in the reaction mixture.

According to some aspects, the method may comprise providing a first metal microstructure, such as a first copper microsheet. It should be understood that the first metal microstructure may be provided by any means known in the art compatible with the present disclosure. For example, a solution comprising copper microsheets may be provided.

As used herein, the term "microstructure" refers to a structure having at least one dimension on the microscale, that is, at least one dimension between about 0.1 and 1000 micrometers. It should be understood that "microstructures" include, but are not limited to, microsheets, microtubes, microparticles (e.g., polyhedral microparticles), microspheres, microwires, microcubes, and combinations thereof. A microsheet may comprise a sheet having a thickness on the microscale. A microwire may comprise a wire having a diameter on the microscale. A microparticle may comprise a particle wherein each spatial dimension thereof is on the microscale.

The first metal microstructure may comprise a copper microsheet. According to some aspects, the copper microsheet may be provided using a copper complex solution. According to some aspects, the copper complex solution may comprise one or more copper complexes. As used herein, the term "copper complex" refers to a complex of copper and one or more complexing agents. Complexing agents useful according to the present disclosure include, but are not limited to, tetradecylamine (TDA), dodecylamine (DDA), hexadecylamine (HAD), octadecylamine (ODA), and oleylamine (OLA). According to some aspects, the copper complex may be provided by combining one or more copper atoms or salts thereof with one or more complexing agents in a solution under an inert atmosphere and stirring for an acceptable length of time at an acceptable temperature. For example, the copper complex may be provided by combining a copper salt and one or more complexing agents in a solution under an inert gas flow. Examples of copper salts include, but are not limited to, copper (I) bromide, copper (I) chloride, copper (I) acetate, and combinations thereof. Examples of inert gases include, but are not limited to, nitrogen gas, argon gas, and combinations thereof. The combined solution may then be heated to a temperature of between about 100 and 300° C. from about one minute to about one hour to provide a copper complex solution comprising the copper complex.

According to some aspects, copper microsheets may be provided by heating the copper complex solution with a ligand. For example, the copper microsheets may be provided by combining the copper complex solution with one or more ligands at an elevated temperature under an inert atmosphere for an acceptable length of time. For example, the copper microsheets may be provided by combining the copper complex solution with a ligand under an inert atmosphere at an elevated temperature of between about 100 and 500° C., optionally between about 200 and 400° C., and optionally about 300° C. The combined solution may be held at the elevated temperature for a time of between about 1 minute and 2 hours, optionally between about 30 and 90 minutes, and optionally about 1 hour, to provide a copper microstructure solution containing the copper microsheets. Examples of ligands include, but are not limited to, oleylamine, trioctylphosphine, tetradecylamine, dodecylamine, octadecylamine, hexadecylamine, trioctylphosphine oxide, oleic acid, and combinations thereof.

According to some aspects, replacing a portion of the first metal atoms comprised by the copper microsheet with a corresponding number of second metal ions may comprise combining a copper microsheet solution with a metal precursor solution. As used herein, the term "first copper microsheet solution" refers to a solution comprising the first metal microsheet as described herein. As used herein, the term "metal precursor solution" refers to a solution comprising oleylamine and a metal-containing compound and hydrates thereof. Examples of metal compounds include, but are not limited to, chloroauric acid ($HAuCl_4$), gold (I) chloride (AuCl), silver nitrate ($AgNO_3$), silver acetate ($CH_3COOAg$), silver trifluoroacetate ($CF_3COOAg$), combinations thereof, and hydrates thereof. According to some aspects, the first copper microstructure solution may be combined with the metal precursor solution at a temperature suitable for the second metal ions to replace a corresponding number of first metal ions. For example, the first copper microsheet solution may be combined with the metal precursor solution at an elevated temperature of between about 10 and 400° C., optionally between about 50 and 300° C., optionally between about 50 and 180° C., optionally between about 60 and 240° C., optionally between about 110 and 150° C., optionally between about 110 and 130° C., optionally between about 130 and 150° C.

It should be understood that the first metal atoms comprised by the first metal microstructure (for example, copper atoms comprised by copper microsheets) will have a first oxidation potential. As used herein, the term "oxidation potential" refers to the energy change required to remove electrons from a material. It should be understood that copper, for example, may have an oxidation potential of about 0.34 V. According to some aspects, the first metal may be a metal with a first oxidation potential of no more than about 0.5 V. The oxidation potential of $Ag^+/Ag$ (0.80 V) and $Au^{3+}/Au$ (1.52 V) is higher than that of $Cu^{2+}/Cu$ (0.34 V), so a galvanic replacement reaction may occur at the surface of Cu microsheet after introducing silver or gold precursor in a Cu microsheets solution.

According to some aspects, the method may comprise replacing a portion of the first metal atoms comprised by the first metal microstructure with a corresponding number of second metal ions. According to some aspects, the second metal may comprise a metal having a second oxidation potential, wherein the second oxidation potential is greater than the first oxidation potential. According to some aspects, the second oxidation potential may be at least about 0.3 V greater than the first oxidation potential, optionally about 0.4 V greater, optionally about 0.6 V greater, optionally about 0.8 V greater, optionally about 0.9 V greater, and optionally about 1.0 V greater.

According to some aspects, the molar ratio of first metal atoms to second metal ions may be selected in order to provide a selected pore size of the resulting porous microsheets. In particular, according to some aspects, the reaction rate of galvanic replacement may increase with an increased concentration of metal precursor. As such, the reaction rate of galvanic replacement may be selected by selecting a certain molar ratio of first metal atoms to second metal ions in the combined solution.

According to some aspects, one or more of the other method steps as described herein may sequentially or simultaneously change the pore size of the porous microsheets. For example, combining the first metal microstructure solution and the metal precursor solution at an elevated temperature suitable for the second metal ions to replace a corresponding number of first metal ions and holding the combined solution at the elevated temperature, as described herein, may sequentially or simultaneously replace a portion of the first metal atoms comprised by the first metal microstructure with a number of second metal ions and promote pore formation.

According to some aspects, the method may comprise a one-step synthetic strategy. As used herein, the term "one-step synthetic strategy" refers to a synthetic strategy wherein at least a first reactant is converted to a reaction product in a single synthesis step. For example, as described herein, the first metal microstructure may be converted to the porous multi-metallic two-dimensional microsheet in a single synthesis step, in particular, combining the first metal microsheet solution and the metal precursor solution at the elevated temperature and holding the combined solution at the reaction temperature for a certain length of time. The reaction temperature can optionally be between about 10 and 400° C., optionally between about 50 and 300° C., optionally between about 50 and 240° C., optionally between about 110 and 150° C., optionally between about 110 and 130° C., or optionally between about 130 and 150° C.

According to some aspects, a method for preparing copper-silver and copper-gold porous microsheets is provided herein, the method comprising: providing a solution comprising copper microsheets; providing a metal precursor solution comprising silver, gold, or combinations thereof; combining the solution comprising copper microsheets with a volume of the metal precursor solution, for example by injection, at a combining rate and at a combining temperature; holding at a reaction temperature for a reaction time; cooling; and isolating the porous microsheets. In some embodiments, portions of the method or the entire method is under an inert atmosphere. The combining rate can be, for example, 0.1 mL/minute to 10 mL/minute.

According to some aspects, the reaction temperature is from 50 to 240° C. According to some aspects, the reaction time is 2 minutes to 240 minutes. In some embodiments, the combining temperature is from 50 to 240° C.

In an embodiment, the metal precursor solution comprises silver at 0.05 M in oleylamine, the volume of the metal precursor solution is 2 mL, the combining rate is 1 mL/minute, the combining temperature and the reaction temperature are both 120° C., the reaction time is 60 minutes, and the porous microsheets comprise copper-silver porous microsheets. The metal precursor solution can be prepared, for example, by dissolving 17 mg of $AgNO_3$ in 2.0 mL of oleylamine.

In an embodiment, the metal precursor solution comprises gold at 0.05 M in oleylamine, the volume of the metal precursor solution is 2 mL, the combining rate is 1 mL/minute, the combining temperature and the reaction temperature are both 140° C., the reaction time is 60 minutes, and the porous microsheets comprise copper-gold porous microsheets. For example, the metal precursor solution can be prepared by dissolving 50 mg of $HAuCl_4.3H_2O$ in 2.0 mL of oleylamine.

According to some aspects, the metal precursor solution comprises one or more metals having an oxidation potential higher than that of $Cu^{2+}/Cu$ (0.34 V). According to some aspects, the metal precursor solution comprises silver, gold, palladium, platinum, nickel, iron, cobalt, or combinations thereof. The oxidation potentials of silver, gold, palladium, platinum are higher than that of $Cu^{2+}/Cu$ (0.34 V), for example. The methods disclosed herein can be applied to a variety of alloys and combinations of metals. In some embodiments, tri-metallic porous microsheets can be prepared, for example, Cu—Ag—Au, Cu—Ag—Pt, Cu—Ag—Ni, Cu—Au—Pt, Cu—Au—Pd, or Cu—Au—Ni porous microsheets can be prepared according to the methods and concepts disclosed herein. The aspects disclosed herein can provide multi-metallic porous microsheets, and non-limiting examples of such are Cu—Ag—Au—Pt, Cu—Ag—Au—Ni, and Cu—Ag—Au—Ni—Fe porous microsheets.

According to some aspects, a method for preparing porous microsheets is provided, the method comprising providing a solution of first metal microsheets comprising copper, nickel, iron, cobalt, or silver microsheets; providing a metal precursor solution of a second metal comprising silver, gold, palladium, platinum, nickel, iron, cobalt, or combinations thereof, wherein the second metal is a different metal than the first metal microsheets; combining the solution comprising the copper, nickel, iron, cobalt, or silver microsheets with a volume of the metal precursor solution at a combining rate and at a combining temperature to form a combined mixture; holding the combined mixture at a reaction temperature for a reaction time; cooling the combined mixture; and isolating the porous microsheets from the combined mixture. According to some aspects, the copper, nickel, iron, cobalt, or silver microsheets can have an average thickness more than 100 nm. Further according to some aspects, the copper, nickel, iron, cobalt, or silver microsheets can have an average length, average width, or average diameter more than 500 nm.

In some embodiments a method is provided for preparing multi-metallic porous microsheets, comprising providing a solution of first metal microsheets including an average thickness more than 100 nm; providing a metal precursor solution comprising second metal ions, wherein the second metal is different from the first metal and has an oxidation potential of at least 0.6 V greater than an oxidation potential of the first metal; and combining the solution of first metal microsheets and the metal precursor solution to replace some of the first metal atoms of the first metal microsheets with the second metal ions and to form the multi-metallic porous microsheet. Further, in some embodiments, the first metal microsheets can have an average length, average width, or average diameter more than 500 nm. Additional or different metals can be utilized as discussed below.

According to some aspects, a method for preparing multi-metallic porous microsheets is provided, the method comprising providing a solution of first metal microsheets; providing a metal precursor solution comprising second metal ions; optionally providing a third metal precursor solution comprising third metal ions; optionally providing a fourth metal precursor solution comprising fourth metal ions; and optionally providing additional metal precursor solutions; wherein the oxidation potential values are in the order of second metal>third metal>fourth metal>first metal, for example. Generally, a metal will be reduced at higher reaction temperature if its oxidation potential value is lower, so, subsequent metals can be reacted with prior metals at higher and higher temperatures, i.e., $T_{2nd}<T_{3rd}<T_{4th}$, in this non-limiting example. Provided these concepts, it should be understood that various metals can be substituted in all methods disclosed herein for "copper" microsheets, with non-limiting examples of Ni, Fe, Co, or Ag provided herein. It should be further understood that various metals can be substituted in all methods disclosed comprising a metal precursor solution based on the aspects disclosed above, with non-limiting examples of silver, gold, palladium, platinum, nickel, iron, cobalt, or combinations thereof.

According to some aspects, the volume of the metal precursor solution combined with the solution comprising copper microsheets is from 0.5 mL to 6.0 mL. In some embodiments, the metal precursor solution can have a metal concentration from 0.01 M to 0.5 M.

According to some aspects, the method further comprises the solution comprising copper microsheets is provided by a synthetic method, the synthetic method comprising: providing a copper complex solution comprising copper and a first complexing agent; preparing a reaction mixture comprising trioctylphosphine by heating the reaction mixture to 290 to 310° C. under inert atmosphere; combining the copper complex solution and the reaction mixture at a temperature of 290 to 310° C. under inert atmosphere, for example, hot-injection may be used to combine; holding the reaction mixture at a temperature of 290 to 310° C. for 55 to 65 minutes under inert atmosphere; and cooling the reaction mixture. In some embodiments, the copper complex solution is provided by heating a mixture comprising oleylamine, 1-octadecene, and copper (I) chloride or copper (I) bromide or copper (I) acetate to a temperature from 100 to 300° C. under inert atmosphere for a time from 1 to 60 minutes.

According to some aspects, copper-silver or copper-gold microsheets, the microsheets comprising a plurality of pores with pore size from 2 to 900 nm.

The disclosure is also directed to copper microstructures provided by the method described herein and devices comprising the copper microstructures provided by the method described herein, as well as methods of using the same.

According to some aspects, the method may further comprise one or more washing steps. The washing step may comprise centrifuging the solution containing the microstructures, removing the supernatant, combining with a solvent such as a hydrophobic solvent and/or an organic solvent, and centrifuging the combined solution. The method may comprise one, two, three, or more washing steps.

Figure 2:
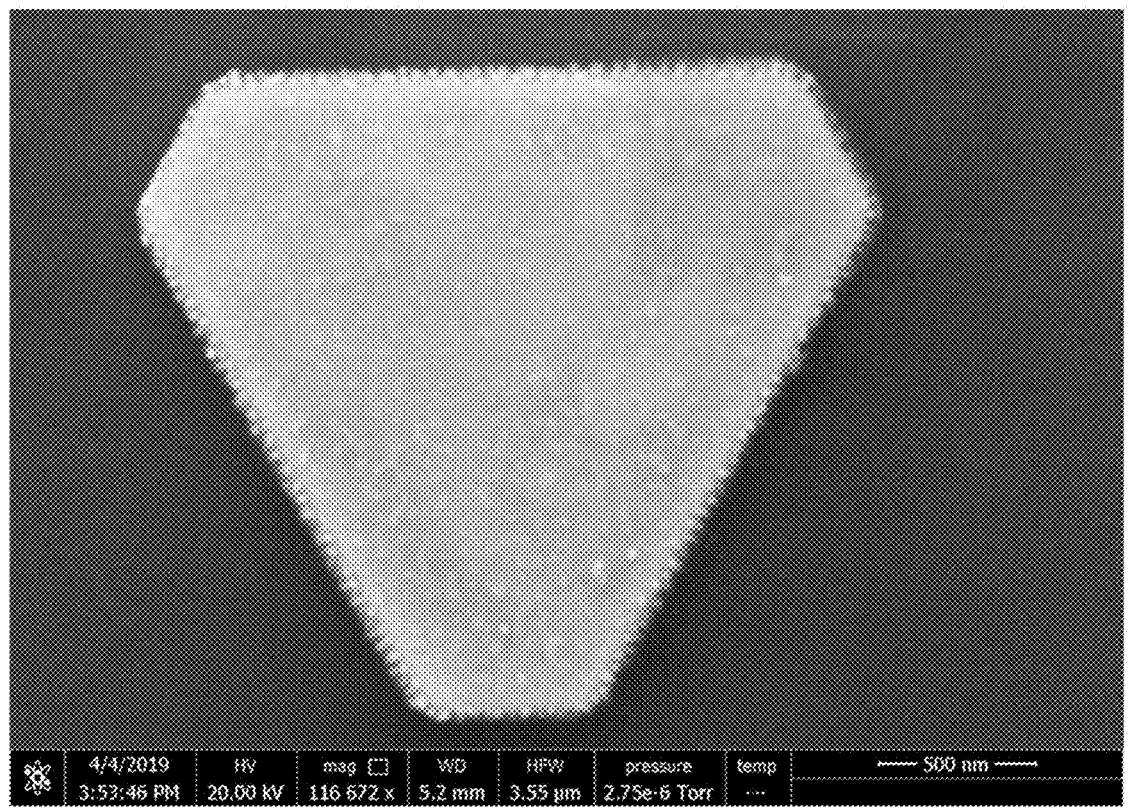
FIG. 2 shows an SEM image of a Cu—Ag microstructure at the initial reaction stage.
Figure 3:
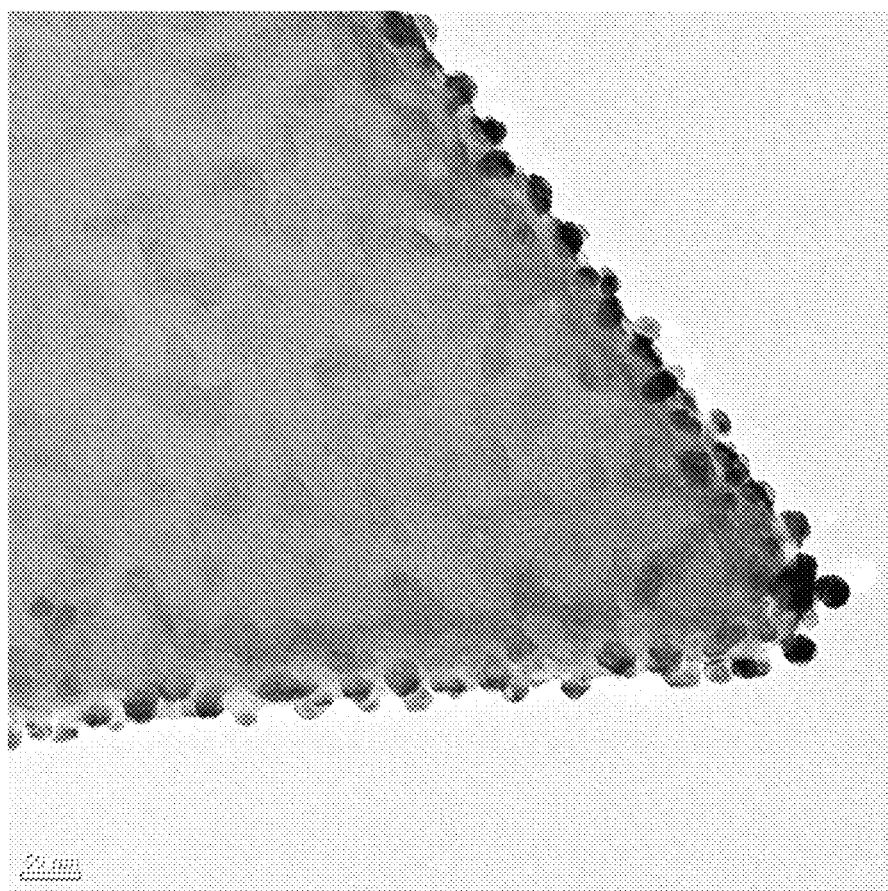
FIG. 3 shows a transmission electron microscope (TEM) image of a Cu—Ag microstructure at the initial reaction stage.
Figure 4:
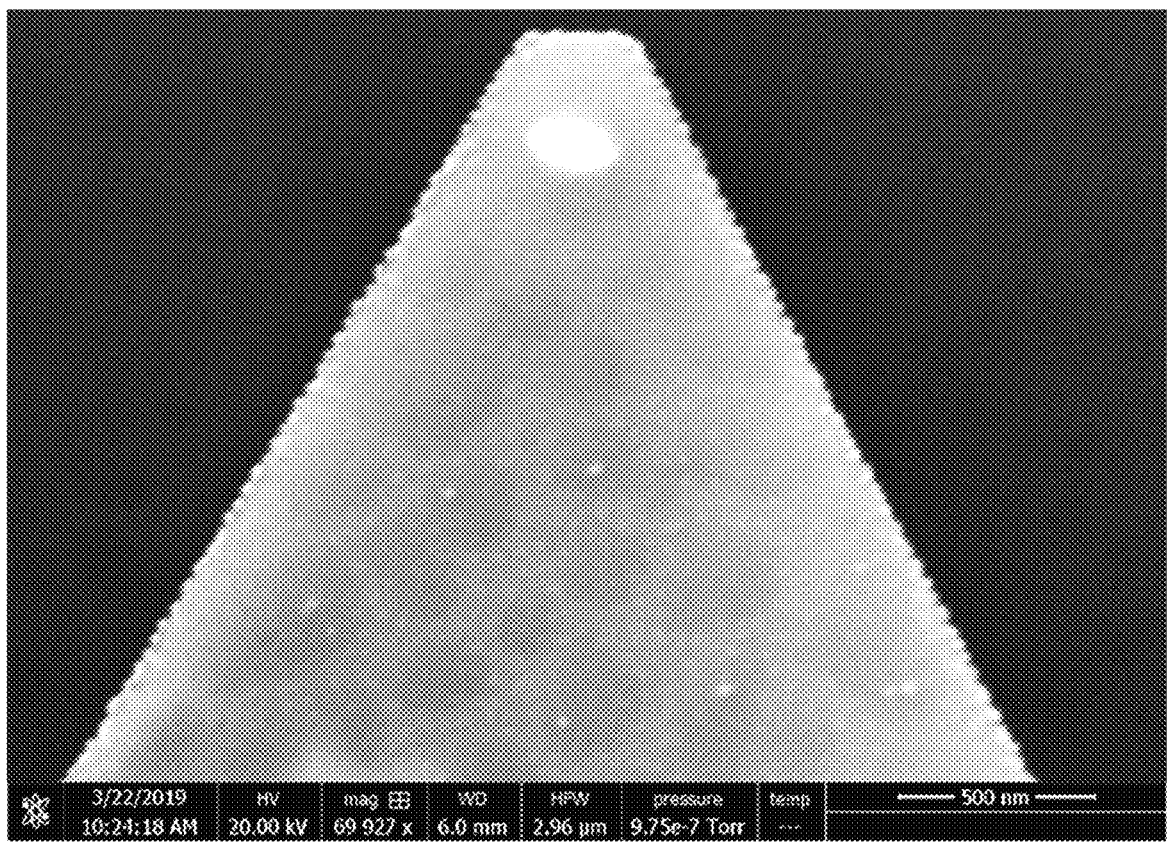
FIG. 4 shows an SEM image of a Cu—Ag microstructure at the intermediate reaction stage.

FIG. 1 indicates the evolution process from pure Cu microsheets to bimetallic porous structures. Because the oxidation potential of Ag+/Ag (0.80 V) and $Au^{3+}/Au$ (1.52 V) is higher than that of $Cu^{2+}/Cu$ (0.34 V), the galvanic replacement reaction may occur at the surface of Cu microsheet after introducing silver or gold precursor in a Cu microsheets solution. It is well-known that the surface energy of different crystalline planes of a face centered cube metal is increased in the order of y{111}<y{100}<y{110}. The front and side facet of Cu microsheets are {111} and {110}, respectively (XRD peaks are annotated by { }). Taking the Cu—Ag system as an example, the galvanic replacement reaction rate at the side face is faster than that of the front face, which is proved by collecting products at the initial reaction stage, as shown in FIGS. 2-3. Ag nanoparticles with an average size of 14 nm were grown on the side face of Cu microsheets, while smaller Ag nanoparticles were sparsely distributed on the front face. With the reaction prolonging, Ag nanoparticles spontaneously gathered to from a bridge or ring on the front face, as shown in FIG. 4. This Ag bridge or ring on the front face, acting like a protective layer, will forbid a galvanic replacement reaction to further occur. Finally, the naked area (where there are no Ag nanoparticles) on the front face of the Cu microsheets evolved into a hole or a pore because the Ag precursor may directly replace surface Cu atoms without steric restriction.

Figure 8:
FIG. 8 shows an SEM image of large area Cu—Ag porous microsheets.

The pore size and composition of Cu—Ag porous sheets may be controlled by adjusting the injection temperature of silver precursors or silver precursors amounts. Smaller pore size and Cu-rich Cu—Ag porous sheets were prepared at lower injecting temperatures or shorter reaction intervals, while bigger pore size and Ag-rich Cu—Ag porous sheets were obtained at higher injection temperatures or longer reaction periods. FIGS. 5A-7B show Cu—Ag porous microsheets with different pore sizes and compositions. Both Ag {111} and Cu {111} peaks appeared in XRD patterns, which indicated the Cu—Ag porous microsheets were in bimetallic phase. Except for these affecting parameters, the injection rate, injection volume, and silver precursor concentration also play important roles for the formation of porous structures. Cu—Ag microsheets with bigger pore size may be prepared under faster injection rate, larger injection volume, and higher concentration of silver precursor, conversely, smaller pore size was obtained. By optimization of the reaction parameters, large area of Cu—Ag porous microsheets have been synthesized as shown in FIG. 8.

Figure 14:
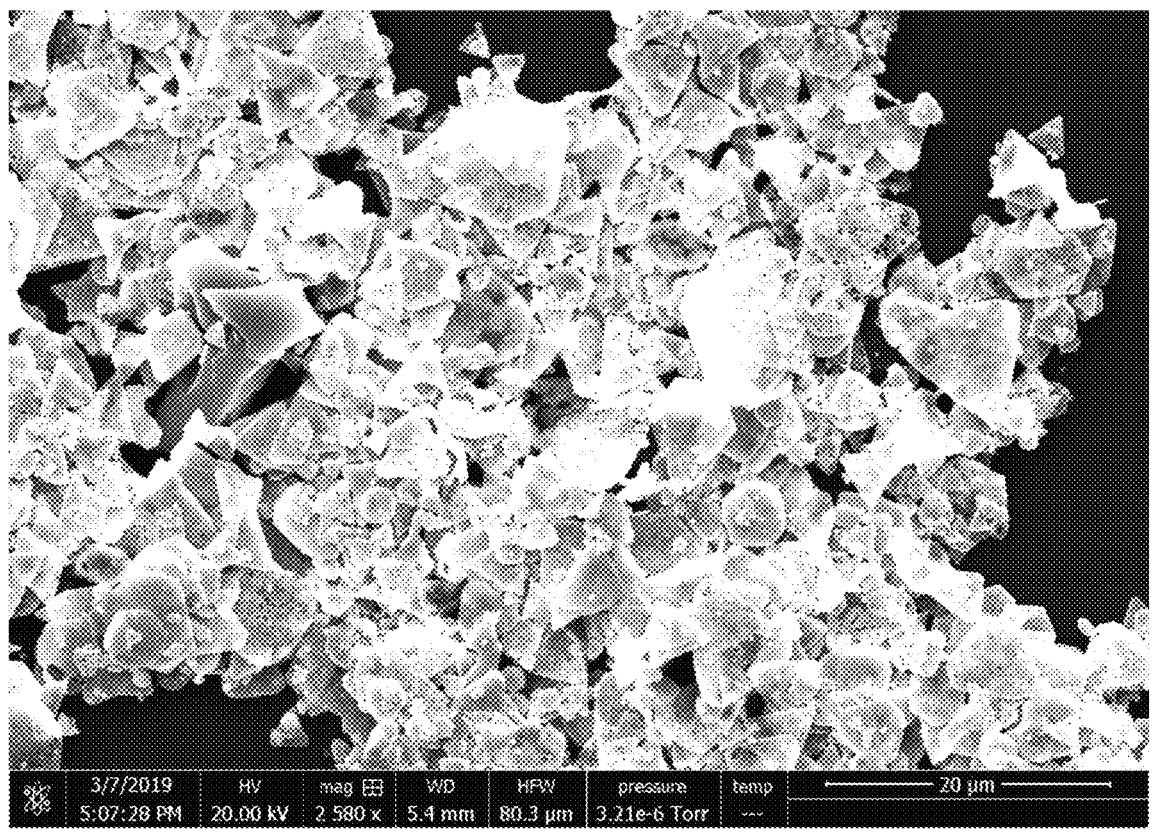
FIG. 14 shows an SEM image of large area Cu—Au porous microsheets with large pore sizes.
Figure 15:
FIG. 15 shows a TEM image of a Cu—Ag porous bimetallic sheet.

The present method is not limited to fabricate Cu—Ag porous microsheets but can also be extended to synthesize Cu—Au porous microsheets. XRD patterns indicated Au-rich Cu—Au porous microsheets were evolved from pure Cu phase to Cu—Au alloying phase and then to separated Cu—Au phases, as shown in FIGS. 9A-12B. The pore size is increased with increased injection temperature of gold precursors. The pore size can vary from a few nanometers to hundreds of nanometers. Cu-rich Cu—Au porous sheets may be obtained under shorter reaction intervals, lower concentration of gold precursors, smaller injection volume, slower injection rate, and lower reaction temperatures; conversely, Au-rich Cu—Au porous microsheets were formed. By optimization of the reaction conditions, large area Cu—Au porous microsheets have been synthesized, as shown in FIGS. 13-14.

As used herein, the terms "uniform" and "uniform size" are defined as remaining the same in all cases and at all times; unchanging in form or character; provided the same reactants and same reaction conditions, the methods provided herein can provide pores having a uniform size. The pore size can be adjusted from 2 nanometers to 900 nanometers through reaction conditions. The methods provided herein further provide pores having a dominating circular shape, with the aspect ratio of an ellipse defined as the ratio of the major axis to the minor axis, a circular shape having an aspect ratio of 1, and the size of a pore defined as the average diameter of the major and minor axes. Under the same reaction conditions, the aspect ratio of the pores provided by the methods herein can be about 1±90%, 1±80%, 1±70%, 1±60%, 1±50%, 1±40%, 1±30%, 1±20%, 1±10%, or 1±5%. For example, if the pore size is from 2 nanometers to 900 nanometers, the variation in pore size can be about ±90%, ±80%, ±70%, ±60%, ±50%, ±40%, ±30%, ±20%, ±10%, or ±5%. The pore size and shape are very repeatable under the same reactants and same reaction conditions.

Figure 16:
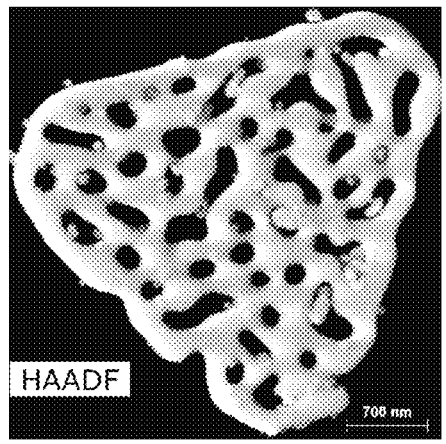
FIG. 16 shows a scanning transmission electron microscope with high angle annular dark field detector (STEM-HAADF) image of a Cu—Ag porous bimetallic sheet.
Figure 17:
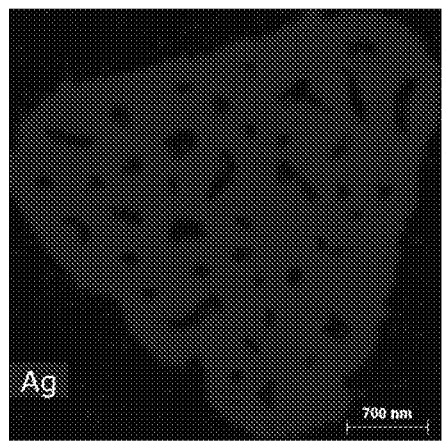
FIG. 17 shows an elemental mapping image, mapping Ag, of a Cu—Ag porous bimetallic sheet.
Figure 18:
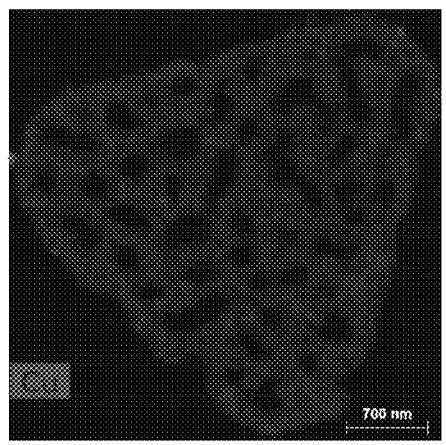
FIG. 18 shows an elemental mapping image, mapping Cu, of a Cu—Ag porous bimetallic sheet.
Figure 19:
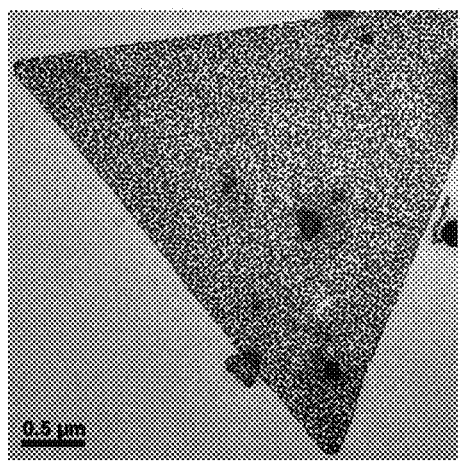
FIG. 19 shows a TEM image of a Cu—Au porous bimetallic sheet.
Figure 20:
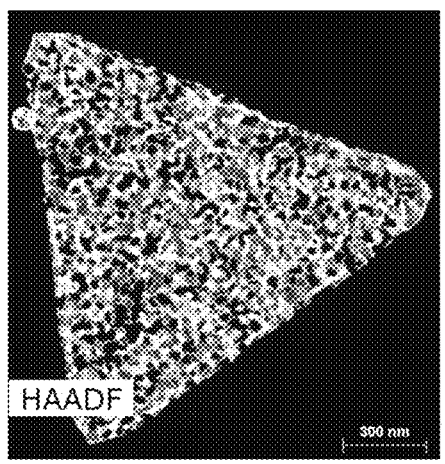
FIG. 20 shows a scanning transmission electron microscope with high angle annular dark field detector (STEM-HAADF) image of a Cu—Au porous bimetallic sheet.
Figure 21:
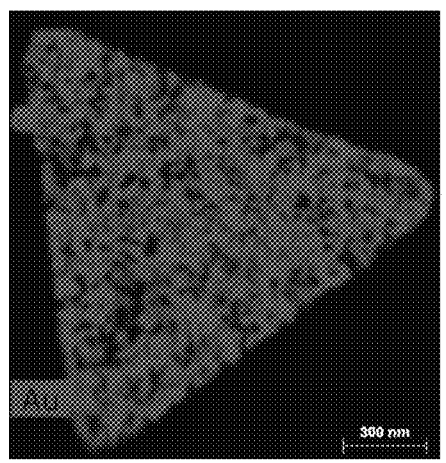
FIG. 21 shows an elemental mapping image, mapping Au, of a Cu—Au porous bimetallic sheet.
Figure 22:
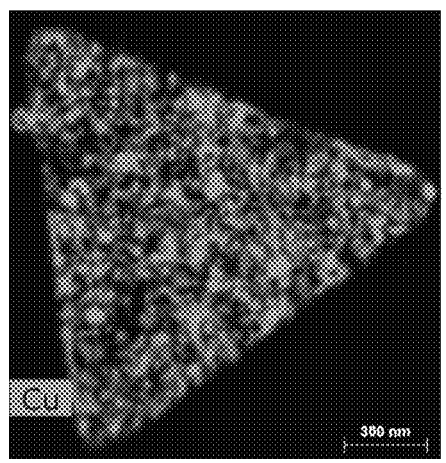
FIG. 22 shows an elemental mapping image, mapping Cu, of a Cu—Au porous bimetallic sheet.

Porous microsheets with bimetallic phase have been confirmed by XRD analysis. FIGS. 15-22 indicate the distribution of both elements (Cu—Ag or Cu—Au) and the hollowness of the porous structures. High-angle annular dark-field scanning transmission electron microscopy (HAADF-STEM) measurements further proved the existence of surface pores due to their different contrasts, as shown in FIGS. 16 and 20. From energy dispersive X-ray (EDX) mapping images (FIGS. 17-18), both Cu and Ag are homogeneously distributed throughout the porous sheet. FIGS. 21-22 also show porous sheets include both Cu and Au elements. These above analyses indicated the current method can be used to successfully prepare bimetallic porous microsheets.

A simple one-pot method has been developed to fabricate Cu—Ag and Cu—Au porous microsheets. Through optimization of reaction parameters, the pore size can vary from a few nanometers to hundreds of nanometers. XRD results indicated Cu—Ag porous sheets were comprised of separated Ag and Cu phases, while Cu—Au porous sheets included isolated Au, Cu and alloying phases. We believe the current synthetic method can be used towards the design and fabrication of other inorganic porous microstructures and nanostructures.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

Herein, the recitation of numerical ranges by endpoints (e.g. 0.01 M to 0.5 M, from 50 to 240° C., between about 2 minutes and 240 minutes) include all numbers subsumed within that range, for example, between about 2 minutes and 240 minutes includes 20, 50, 70, and 100 minutes as endpoints within the specified range. Thus, for example, ranges 20-180, 50-190, 70-120, etc. are also ranges with endpoints subsumed within the range 2-240 depending on the starting materials used, desired outcomes, specific applications, specific embodiments, or limitations of the claims if needed. The Examples and methods disclosed herein demonstrate the recited ranges subsume every point within the ranges because different synthetic products result from changing one or more reaction parameter. Further, the methods and Examples disclosed herein describe various aspects of the disclosed ranges and the effects if the ranges are changed individually or in combination with other recited ranges.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

In some embodiments, the methods disclosed herein can be conducted in steps, for example, in a method for the preparation of multiple-metallic porous structures, adding subsequent metal ions step-by-step can be done. Alternatively, in a non-limiting example, the methods disclosed herein can be conducted by adding all of the various metal ions at the same time to a solution comprising metal microsheets, for example, with subsequent adjustments to the reaction temperature and intervals, in order to incorporate all the various metals, since each metal can require different reaction conditions, into the porous microsheets for various applications. As used herein, the term "copper" is utilized as a non-limiting example in disclosing the methods, as well as "copper-silver" and "copper-gold". The non-limiting terms for other metals, for example silver, gold, palladium, platinum, nickel, iron, cobalt, or combinations of these with any metal, are utilized as non-limiting examples to describe the methods and the underlying concepts of the methods herein. In as much as one or more metal can be substituted, or any other metal substituted for one or another in all the methods disclosed herein, all terms for all metals can be used interchangeable throughout as one with skill in the art, with the methods and concepts disclosed herein, can modify said methods for various applications. Such modifications, while presented as non-limiting examples above, further demonstrate the disclosures herein are not limited by the various embodiments discussed herein.

Further as used herein, the term "nanostructure" refers to a structure having at least one dimension on the nanoscale, that is, at least one dimension between about 0.1 and 1000 nm. It should be understood that "nanostructures" include, but are not limited to, nanosheets, nanopores, nanotubes, nanoparticles (e.g., polyhedral nanoparticles), nanospheres, nanowires, nanocubes, and combinations thereof. A nanosheet may comprise a sheet having a thickness on the nanoscale. A nanowire may comprise a wire having a diameter on the nanoscale. A nanoparticle may comprise a particle wherein each spatial dimension thereof is on the nanoscale. As used herein, a nanostructure can have one or more dimensions greater than a micron. As used herein, various microstructures can be defined as having an average thickness in nanometers, an average length in nanometers, an average width in nanometers, or an average diameter in nanometers. When applied to a plurality of microstructures or nanostructures, the average dimensions disclosed herein can be determined using a volume weighted average, a numeric weighted average, or an area weighted average, as non-limiting examples, as various methods for determining particle size, nanostructure size, and microstructure size are known in the art.

EXAMPLES

Example I: Synthesis of Cu-OLA Precursor Complex Solution

Copper (I) bromide (99.99%), Copper (I) chloride (99.99%), trioctylphosphine (TOP, 97%), oleylamine (OLA, 70%), chloroauric acid trihydrate (99.9%), silver nitrate (99%), and 1-octadecene (98%) were purchased from Sigma-Aldrich. Copper (I) chloride and trioctylphosphine were stored in glove box. Chloroauric acid trihydrate was stored in fridge. Other chemicals were used as received.

Synthesis of Cu-OLA precursor complex solution: 290 mg of copper (I) bromide (2 mmol), 1.0 mL of OLA, and 2 mL of ODE were added into the flask where oxygen was removed under Ar or $N_2$ flow. After Ar or $N_2$ blowing for 10 minutes, the mixed solution was heated to 190° C. on a hot plate and kept at this temperature for 20 minutes. Copper (I) bromide may be replaced by copper (I) chloride.

Example II: Synthesis of Cu—Ag Porous Microsheets 6.0 mL of OLA (70%) was loaded into a 25 mL three-neck flask where oxygen was removed through Ar blowing for 10 minutes. Under Ar flow, 2.0 mL of TOP (97%) was injected into the flask. After 10 minutes of Ar flowing, the flask was rapidly heated to 300° C. at a heating rate of 15-25° C./min. Next, 3.0 mL of Cu-OLA complex solution was quickly injected into the hot flask and the reaction solution turned to red after prolonging reaction for 5-10 minutes. The reaction was held at 300° C. for 60 minutes. The reaction mixture was then naturally cooled to 120° C. and 2.0 mL of silver precursor solution (0.05 M, 17 mg of $AgNO_3$ was dissolved in 2.0 mL of oleylamine) was slowly injected at the rate of 1.0 mL/min. The reaction solution was kept at 120° C. for 60 minutes. The products were separated by centrifuging at 2000 rpm for 3 minutes. The supernatant was discarded. The products were dispersed in 5 mL of hexane (or another hydrophobic solvent such as toluene or chloroform) by sonication process and the mixture was centrifuged at 2000 rpm for 3 minutes. The washing procedure was repeated twice to remove unreacted precursors and surfactant. The Cu—Ag porous microsheets were stored in a hydrophobic solvent (for example: hexane, toluene or chloroform) before characterization. Under these reaction conditions, the morphologies of the pores include a mixture of circular, ellipse, and polygonal shapes with a moderate size distribution about 280±50 nm.

The volume of Cu microsheet reaction solution may vary from 5.0 mL to 200 mL. The amounts of silver precursor solution may vary from 0.5 mL to 6.0 mL ($C_{Ag+}$=0.05 M). The concentration of silver precursor may vary from 0.01 M to 0.5 M. The injection temperature of silver precursor solution may vary from 50° C. to 180° C. The reaction time may change from 2 minutes to 180 minutes after injecting silver precursor solution. The injection rate of silver precursors may be adjusted from 0.1 mL/min. to 10 mL/min.

Example III: Synthesis of Cu—Au Porous Microsheets 6.0 mL of OLA (70%) was loaded into a 25 mL three-neck flask where oxygen was removed through Ar blowing for 10 minutes. Under Ar flow, 2.0 mL of TOP (97%) was injected into the flask. After 10 minutes of Ar flowing, the flask was rapidly heated to 300° C. Next, 3.0 mL of Cu-OLA complex solution was quickly injected into a hot flask and the reaction solution turned to red after prolonging reaction for 5-10 minutes. The reaction was held at 300° C. for 60 minutes. The reaction mixture was then naturally cooled to 140° C. and 2.0 mL of gold precursor solution (0.05 M, 50 mg of $HAuCl_{4+}.3H_2O$ was dissolved in 2.0 mL of oleylamine) was slowly injected at the rate of 1.0 mL/min. The temperature of reaction solution was reduced to 132° C.~137° C. during the injection of copper precursor process. After injection, the reaction solution was raised to 140° C. and kept at this temperature for 60 minutes. The products were separated by centrifuging at 2000 rpm for 3 minutes. The supernatant was discarded. The products were dispersed in 5 mL of hexane (or another hydrophobic solvent such as toluene or chloroform) by sonication and the mixture was centrifuged at 2000 rpm for 3 minutes. The washing procedure was repeated twice to remove unreacted precursors and surfactant. The Cu—Au porous microsheets were stored in a hydrophobic solvent (for example: hexane, toluene or chloroform) before characterization. Under these reaction conditions, the majority of pores has a circular shape while a small fraction may have ellipse or polygonal shape. The pore size is narrowly distributed around 29±5.0 nm.

The volume of Cu microsheet reaction solution may vary from 5.0 mL to 200 mL. The amounts of gold precursor solution may vary from 0.5 mL to 6.0 mL ($C_{Au+}$=0.05 M). The concentration of gold precursor may vary from 0.01 M to 0.5 M. The injection temperature of gold precursor solution may vary from 60° C. to 240° C. The reaction time may change from 5 minutes to 240 minutes after injecting gold precursor solution. The injection rate of gold precursors may be adjusted from 0.1 mL/min to 10 mL/min.

Example IV: Characterization of Cu—Ag and Cu—Au Porous Microsheets

The surface morphologies were investigated by a scanning electron microscope (SEM, QUANTA FEG 650) from FEI with a field emitter as electron source. Transmission electron microscopy (TEM) images were captured using an FEI Tecnai 20 microscope with an accelerating voltage of 200 kV. Energy Dispersive X-Ray spectrometer (EDS) mapping image and the high-angle annular dark-field (HAADF) image were collected by employing the probe-corrected Titan3™ 80-300 S/TEM with an accelerating voltage of 300 kV. A Bruker D8 Advance X-ray diffractometer with Cu Kα radiation operated at a tube voltage of 40 kV and a current of 40 mA was used to obtain X-ray diffraction (XRD) patterns.

What is claimed is:

1. A method for preparing porous microsheets, the method comprising:
    providing a solution of first metal microsheets comprising copper, nickel, iron, cobalt, or silver microsheets;
    providing a metal precursor solution of a second metal comprising silver, gold, palladium, platinum, nickel, iron, cobalt, or combinations thereof, wherein the second metal is a different metal than the first metal microsheets;
    injecting the metal precursor solution into the solution of the first metal microsheets with a volume of the metal precursor solution at a combining rate and at a combining temperature to form a combined mixture;
    holding the combined mixture at a reaction temperature for a reaction time;
    cooling the combined mixture; and
    isolating resulting microsheets from the combined mixture.

2. The method of claim 1, wherein the combining temperature is from 50 to 240° C.

3. The method of claim 1, wherein the reaction temperature is from 10 to 300° C.

4. The method of claim 1, wherein the reaction time is 2 minutes to 240 minutes.

5. The method of claim 1, wherein at least one step of the method is conducted under an inert atmosphere.

6. The method of claim 1, further comprising adding a hydrophobic solvent during or after cooling the combined mixture and before isolating the resulting microsheets.

7. The method of claim 1, further comprising washing the porous microsheets with a hydrophobic solvent one or more times after isolating the porous microsheets.

8. The method of claim 1, wherein the metal precursor solution has a metal concentration from 0.01 M to 0.5 M.

9. A method for preparing porous microsheets, the method comprising:
    providing a solution of first metal microsheets comprising copper, nickel, iron, cobalt, or silver microsheets;
    providing a metal precursor solution of a second metal comprising silver, gold, palladium, platinum, nickel, iron, cobalt, or combinations thereof, wherein the second metal is a different metal than the first metal microsheets;

combining the solution comprising the copper, nickel, iron, cobalt, or silver microsheets with a volume of the metal precursor solution at a combining rate and at a combining temperature to form a combined mixture;

holding the combined mixture at a reaction temperature for a reaction time;

cooling the combined mixture; and isolating resulting microsheets from the combined mixture, wherein the solution of first metal microsheets comprise copper microsheets and is provided by a synthetic method, the synthetic method comprising:

providing a copper complex solution comprising copper and a first complexing agent;

preparing a reaction mixture comprising trioctylphosphine by heating the reaction mixture to 290 to 310° C. under inert atmosphere;

combining the copper complex solution and the reaction mixture at a temperature of 290 to 310° C. under inert atmosphere;

holding the reaction mixture at a temperature of 290 to 310° C. for 55 to 65 minutes under inert atmosphere; and cooling the reaction mixture.

10. The method of claim 9, wherein the copper complex solution is provided by heating a mixture comprising oleylamine, 1-octadecene, and copper (I) chloride or copper (I) bromide to a temperature from 100 to 300° C. under inert atmosphere for a time from 1 to 60 minutes.

11. The method of claim 9, wherein the metal precursor solution of the second metal comprises silver, the metal precursor solution comprising silver at 0.05 M in oleylamine, wherein the volume of the metal precursor solution is 2 mL, wherein the combining rate is 1 mL/minute, wherein the combining temperature and the reaction temperature are 120° C., wherein the reaction time is 60 minutes, and wherein the porous microsheets comprise copper-silver porous microsheets.

12. The method of claim 9, wherein the metal precursor solution of the second metal comprises gold, the metal precursor solution comprising gold at 0.05 M in oleylamine, wherein the volume of the metal precursor solution is 2 mL, wherein the combining rate is 1 mL/minute, wherein the combining temperature and the reaction temperature are 140° C., wherein the reaction time is 60 minutes, and wherein the porous microsheets comprise copper-gold porous microsheets.

13. A method for preparing porous microsheets, the method comprising:

providing a solution of first metal microsheets comprising copper, nickel, iron, cobalt, or silver microsheets;

providing a metal precursor solution of a second metal comprising silver, gold, palladium, platinum, nickel, iron, cobalt, or combinations thereof, wherein the second metal is a different metal than the first metal microsheets;

combining the solution comprising the copper, nickel, iron, cobalt, or silver microsheets with a volume of the metal precursor solution at a combining rate and at a combining temperature to form a combined mixture;

holding the combined mixture at a reaction temperature for a reaction time;

cooling the combined mixture; and isolating resulting microsheets from the combined mixture, wherein the copper, nickel, iron, cobalt, or silver microsheets have an average thickness more than 100 nm.

14. A method for preparing porous microsheets, the method comprising:

providing a solution of first metal microsheets comprising copper, nickel, iron, cobalt, or silver microsheets;

providing a metal precursor solution of a second metal comprising silver, gold, palladium, platinum, nickel, iron, cobalt, or combinations thereof, wherein the second metal is a different metal than the first metal microsheets;

combining the solution comprising the copper, nickel, iron, cobalt, or silver microsheets with a volume of the metal precursor solution at a combining rate and at a combining temperature to form a combined mixture;

holding the combined mixture at a reaction temperature for a reaction time;

cooling the combined mixture; and isolating resulting microsheets from the combined mixture, wherein the copper, nickel, iron, cobalt, or silver microsheets have an average length, average width, or average diameter more than 500 nm.

* * * * *